United States Patent
Jerbi et al.

(10) Patent No.: US 8,826,275 B2
(45) Date of Patent: Sep. 2, 2014

(54) SYSTEM AND METHOD FOR SELF-AWARE VIRTUAL MACHINE IMAGE DEPLOYMENT ENFORCEMENT

(75) Inventors: Amir Jerbi, Givatayim (IL); Michael Kletskin, Matan (IL); Eitan Hadar, Nesher (IL)

(73) Assignee: CA, Inc., Islandia, NY (US)

( * ) Notice: Subject to any disclaimer, the term of this patent is extended or adjusted under 35 U.S.C. 154(b) by 202 days.

(21) Appl. No.: 13/223,651

(22) Filed: Sep. 1, 2011

(65) Prior Publication Data

US 2013/0061219 A1    Mar. 7, 2013

(51) Int. Cl.
*G06F 9/455* (2006.01)
*G06F 9/46* (2006.01)
*G06F 21/57* (2013.01)

(52) U.S. Cl.
CPC .............. *G06F 9/468* (2013.01); *G06F 21/577* (2013.01)
USPC ........................................................... 718/1

(58) Field of Classification Search
USPC ........................................................... 718/1
See application file for complete search history.

(56) References Cited

U.S. PATENT DOCUMENTS

| | | | |
|---|---|---|---|
| 6,219,786 B1 * | 4/2001 | Cunningham et al. | 713/152 |
| 7,036,122 B2 | 4/2006 | Bennett et al. | |
| 7,356,679 B1 | 4/2008 | Le et al. | |
| 7,757,231 B2 | 7/2010 | Anderson et al. | |
| 7,793,101 B2 * | 9/2010 | Wipfel et al. | 713/168 |
| 7,797,748 B2 | 9/2010 | Zheng et al. | |
| 7,877,781 B2 | 1/2011 | Lim | |
| 8,301,686 B1 * | 10/2012 | Appajodu et al. | 709/201 |
| 2004/0111630 A1 | 6/2004 | Hwang et al. | |
| 2007/0174915 A1 | 7/2007 | Gribble et al. | |
| 2007/0233698 A1 * | 10/2007 | Sundar et al. | 707/10 |
| 2007/0250930 A1 | 10/2007 | Aziz et al. | |
| 2008/0134175 A1 * | 6/2008 | Fitzgerald et al. | 718/1 |
| 2008/0320594 A1 | 12/2008 | Jiang | |
| 2009/0125974 A1 * | 5/2009 | Zhang et al. | 726/1 |
| 2009/0133017 A1 | 5/2009 | Boogert et al. | |
| 2009/0254990 A1 | 10/2009 | McGee | |
| 2009/0319782 A1 | 12/2009 | Lee | |
| 2009/0320014 A1 | 12/2009 | Sudhakar | |
| 2010/0071035 A1 | 3/2010 | Budko et al. | |
| 2010/0107160 A1 | 4/2010 | Srinivasan | |
| 2010/0122343 A1 | 5/2010 | Ghosh et al. | |

(Continued)

OTHER PUBLICATIONS

Arun Thomas, Glenn Ammons, Glenn Ammons, Todd Mummert, Bowen Alpern, Vasanth Bala, Opening black boxes: using semantic information to combat virtual machine image sprawl, 2008, Proceedings of the fourth ACM SIGPLAN/SIGOPS international conference on Virtual execution environments.*

Arun Thomas, et al, Opening Black Boxes: U Using, Opening black boxes: using semantic information to combat virtual machine image sprawl, 2008, ACM.*

(Continued)

*Primary Examiner* — Emerson Puente
*Assistant Examiner* — Charlie Sun
(74) *Attorney, Agent, or Firm* — Baker Botts, LLP

(57) ABSTRACT

According to one embodiment of the present disclosure, a method includes receiving a request to instantiate a virtual machine image in a virtualization environment. The method also includes sending a request for verification of the virtualization environment. The method further includes receiving information from the enforcement module in response to the request for verification of the virtualization environment. The method further includes determining whether the virtualization environment is verified based on the information received.

18 Claims, 3 Drawing Sheets

(56) References Cited

U.S. PATENT DOCUMENTS

| | | | |
|---|---|---|---|
| 2010/0132011 A1 | 5/2010 | Morris et al. | |
| 2010/0199351 A1 | 8/2010 | Protas | |
| 2010/0235825 A1 | 9/2010 | Azulay et al. | |
| 2010/0325284 A1* | 12/2010 | Heim et al. | 709/227 |
| 2011/0004935 A1 | 1/2011 | Moffie et al. | |
| 2011/0107106 A1* | 5/2011 | Morii et al. | 713/176 |
| 2011/0219447 A1* | 9/2011 | Horovitz et al. | 726/22 |
| 2011/0239210 A1* | 9/2011 | Kotani et al. | 717/171 |
| 2012/0233678 A1* | 9/2012 | Pal | 726/7 |

OTHER PUBLICATIONS

White Paper, Managing Access in a Virtualized Environment, Copyright © 2006, CA.

Matthew Sarrel, Managing the Virtual Image Life Cycle, Posted Sep. 28, 2010, Virtualization Technology.

White Paper, "Intel® Cloud Builder Guide to Cloud Design and Deployment on Intel® Xeon® Processor-based Platforms," Enomaly Elastic Computing Platform, Service Provider Edition, Copyright © 2010 Intel Corporation and Enomaly Inc.

* cited by examiner

SYSTEM AND METHOD FOR SELF-AWARE VIRTUAL MACHINE IMAGE DEPLOYMENT ENFORCEMENT

TECHNICAL FIELD

The present disclosure relates generally to virtual machine image deployment enforcement and more particularly to a system and method for the verification of a virtualization environment before allowing the instantiation of a virtual machine image in the virtualization environment.

BACKGROUND

In existing systems, virtual machine images may be fully instantiated and may begin to run in a virtualization environment before security controls and credentials are initiated on the virtual machine. Therefore, it is possible for virtual machine images to be extracted from a verified environment and instantiated in another unverified location.

SUMMARY

According to one embodiment of the present disclosure, a method includes receiving a request to instantiate a virtual machine image in a virtualization environment. The method also includes sending a request for verification of the virtualization environment. The method further includes receiving information from the enforcement module in response to the request for verification of the virtualization environment. The method further includes determining whether the virtualization environment is verified based on the information received.

In some embodiments of the present disclosure, the method may include allowing the request to instantiate the first virtual machine in the virtualization environment in response to a successful verification of the virtualization environment. In other embodiments of the present disclosure, the method may include denying the request to instantiate the first virtual machine in the virtualization environment in response to a failed verification of the virtualization environment.

Technical advantages of the present disclosure include separating the deployment security needs from other security needs in order to increase the efficiency and security of deployed virtual machine images. Particular embodiments of the present disclosure may allow for the interception and prevention of virtual machine image instantiations in unauthorized virtualization environments. Further embodiments may allow for governing the compliance of instantiated virtual machine images with one or more virtual machine deployment policies. Some embodiments may also allow for generating alerts indicating non-compliance with the virtual machine deployment policies.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION OF EXAMPLE EMBODIMENTS

Figure 1:
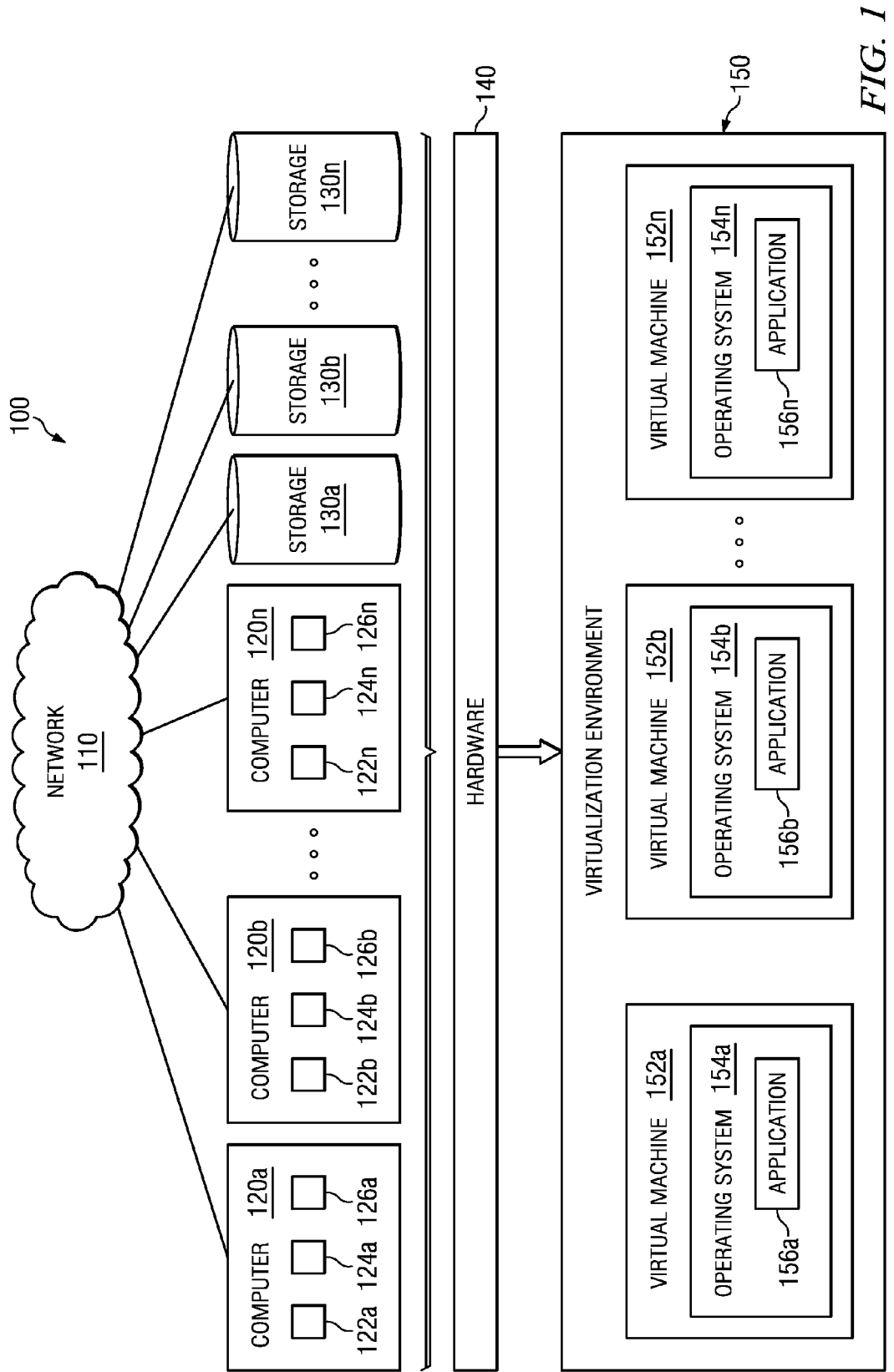
FIG. 1 illustrates a system including a virtualization environment running on shared hardware.
Figure 2:
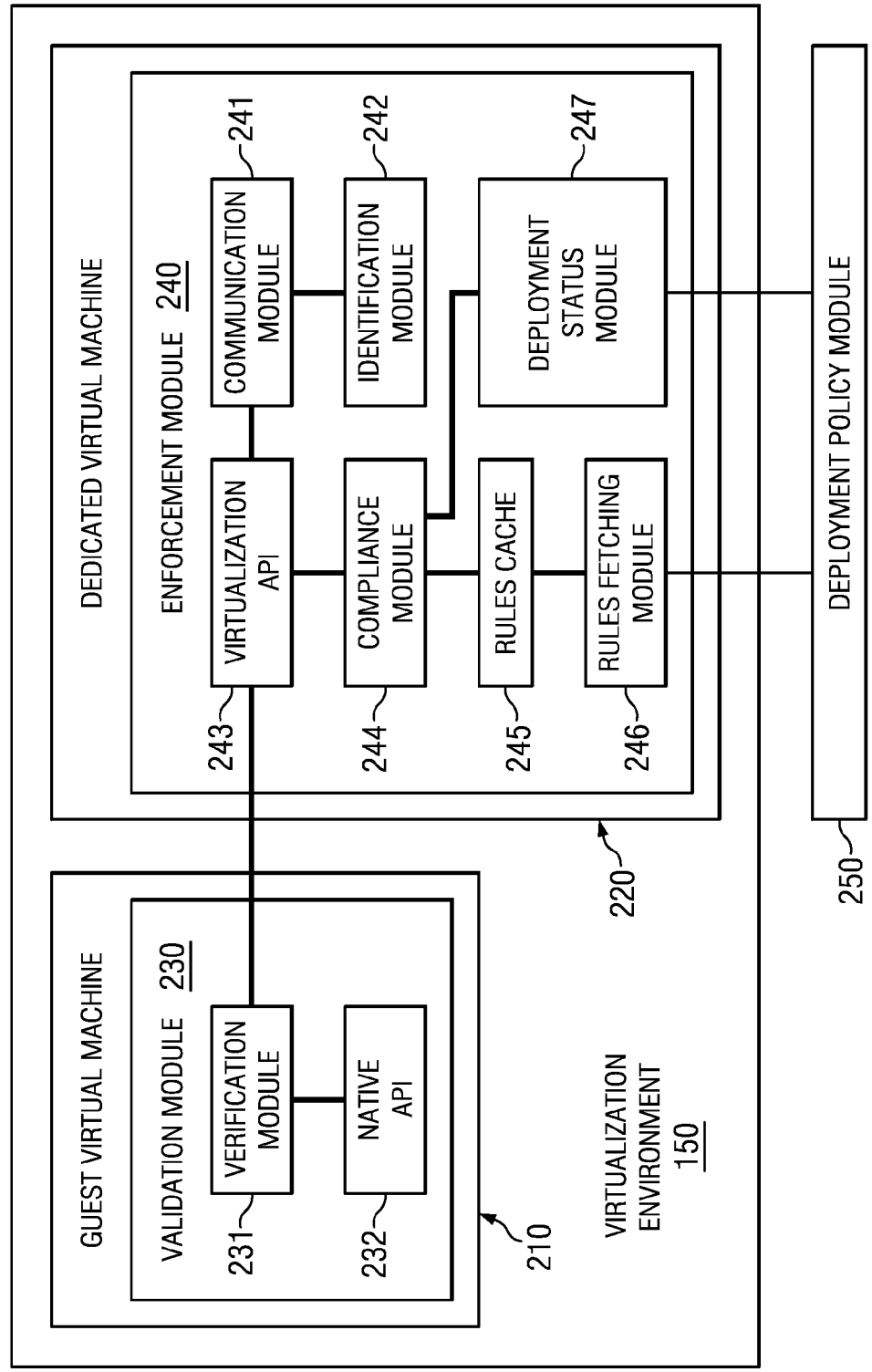
FIG. 2 illustrates an example of a virtualization environment running on shared hardware.
Figure 3:
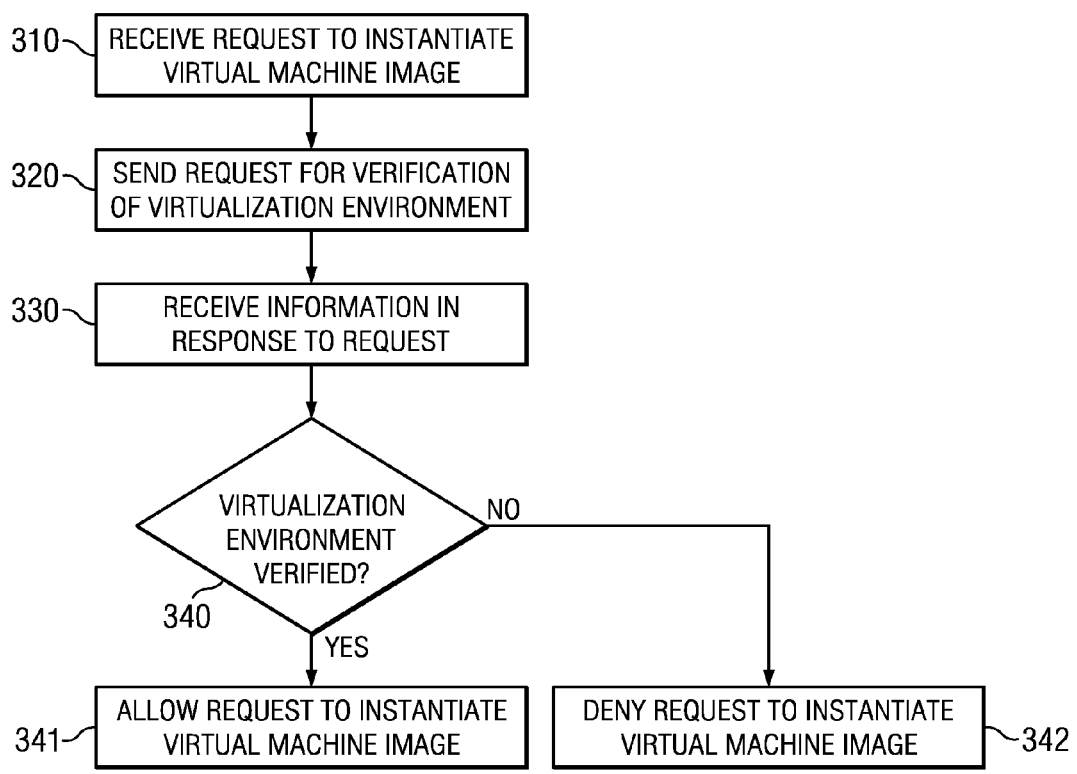
FIG. 3 illustrates an example method for verifying a virtualization environment before allowing the instantiation of a virtual machine image.

Embodiments of the present disclosure and its advantages are best understood by referring to FIGS. 1 through 3 of the drawings, like numerals being used for like and corresponding parts of the various drawings.

FIG. 1 illustrates a system 100 that includes a virtualization environment 150 running on shared hardware 140, and may embody aspects of the present disclosure. In particular embodiments, system 100 may be used to harden an enterprise computing system and prevent unauthorized instantiation and/or theft of virtual machine images. In existing systems, security controls and credentials are initiated only after a virtual machine image is instantiated in a virtualization environment. In other words, a virtual machine image in these systems will implement security measures (e.g. preventing unauthorized users from logging in and/or encrypting sensitive data) only after it has booted and has begun to run in the environment. Because of this, it is possible for a virtual machine image to be instantiated in an unauthorized virtualization environment, either intentionally or unintentionally. Exploitation of this vulnerability can potentially lead to theft of virtual machine images, or instantiations of unauthorized virtual machine images on the enterprise computing system by insiders.

In accordance with the present disclosure, deployment security needs may be separated from other security needs in order to increase the efficiency and security of deployed virtual machine images. One aspect of the present disclosure is autonomic computing, wherein a virtual machine image may be "self-aware." That is, a virtual machine image may be aware of its own actions, and may verify its ability to carry out such actions before actually executing them. For example, particular embodiments of the present disclosure may allow for a virtual machine image to verify the virtualization environment in which it is located prior to instantiation. If the verification fails (e.g. the virtualization environment is unauthorized), the virtual machine image may prohibit its own instantiation in the environment. If the environment is verified, the virtual machine image may allow itself to instantiate in the environment. Further embodiments may allow for governing the compliance of instantiated virtual machine images with one or more virtual machine deployment policies. Some embodiments may also allow for generating alerts indicating any non-compliance with the virtual machine deployment policies.

System 100 may utilize hardware virtualization techniques to run one or more virtual machines 152 inside one or more virtualization environments 150. Hardware virtualization may refer to the abstraction of computer hardware resources, allowing for the sharing of the underlying resources between the one or more virtual machines. Shared hardware 140 may run virtualization software operable to create a virtualization environment 150. Examples of virtualization software include VMware ESXi and Microsoft Hyper-V. Virtualization environment 150 may run on shared hardware 140, which includes a network 110, one or more computer systems 120, and storage 130. In some embodiments, virtualization environment 150 may run on a plurality of computer systems 130 in shared hardware 140. In other embodiments, virtualization environment may run on a singe computer system 130 in shared hardware 140.

Virtualization environment 150 may be operable to run one or more virtual machines 152. A virtual machine may refer to the software implementation of a physical machine, wherein the virtual machine may provide computer functionality and execute an operating system and one or more software programs. For example, virtual machines 152 may run operating systems such as Microsoft Windows, Linux, and Mac OS. In addition to running operating system 154, virtual machines 152 may run one or more software applications 156, programs, modules, and/or other logic that may be encoded in one or more tangible computer-readable media and may perform operations when executed by processor 122. In certain embodiments, virtual machines 152 may be virtual appliance virtual machines.

Network 110 may refer to any interconnecting system capable of transmitting audio, video, signals, data, messages, or any combination of the preceding. Network 110 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise internet, or any other suitable communication link, including combinations thereof. Network 110 may connect a plurality of computer systems 120.

Computer system 120 includes a processor 122, memory 124, and an interface 126. Processor 122 may refer to any suitable device operable to execute instructions and manipulate data to perform operations for computer system 120. Processor 122 may include, for example, any type of central processing unit (CPU).

Memory 124 stores information and may comprise one or more tangible, computer-readable, and/or computer-executable computer readable medium, and may exclude signals or carrier waves. Examples of memory include computer memory (for example, Random Access Memory (RAM) or Read Only Memory (ROM)), mass computer readable media (for example, a hard disk), removable computer readable media (for example, a Compact Disk (CD) or a Digital Video Disk (DVD)), and/or other computer-readable medium.

Interface 126 may refer to any suitable device operable to receive input for computer system 120, send output from computer system 120, perform suitable processing of the input or output or both, communicate to other devices, or any combination of the preceding. Interface 126 may include appropriate hardware (e.g. modem, network interface card, etc.) and software, including protocol conversion and data processing capabilities, to communicate through a LAN, WAN, or other communication system that allows computer system 120 to communicate to other devices. Interface 126 may include one or more ports, conversion software, or both.

Storage 130 may provide additional data storage capacity and may include database and/or network storage (for example, a server), or any other suitable tangible, computer-readable storage media. In certain embodiments, storage 130 may include network resources, such as one or more storage area networks (SAN) or network-attached storage (NAS).

FIG. 2 illustrates an example of a virtualization environment 150 running on computer system 120. In accordance with at least one embodiment of the present disclosure, virtualization environment 150 may run one or more guest virtual machines 210. In certain embodiments, guest virtual machine 210 may be based on a virtual machine image. In such embodiments, the virtual machine image may comprise a validation module 230, wherein the validation module 230 comprises logic that may be encoded in one or more tangible media and may perform operations when executed by processor 122. In particular embodiments, validation module 230 ensures that guest virtual machine 210 is in a verified and/or trusted virtualization environment prior to instantiation of the virtual machine image. In some embodiments, this may involve validation module 230 checking for the existence of a verified enforcement module 240 within virtualization environment 150 before instantiation of the virtual machine image. In certain embodiments, validation module 230 may comprise a verification module 231 which may communicate with enforcement module 240 on dedicated virtual machine 220 to verify virtualization environment 150.

In particular embodiments, validation module 230 may receive a request to instantiate a virtual machine image on guest virtual machine 210. The request to instantiate a virtual machine image may include any suitable instruction for beginning the process of instantiation in virtualization environment 150. In response to the request, verification module 231 may be operable to send a request for verification of the virtualization environment to enforcement module 240. Verification module 231 may then receive information from enforcement module 240 in response to the request for verification. Based on the information received from enforcement module 240, verification module 231 may then determine whether virtualization environment 150 is verified. In some embodiments, the information received from enforcement module 240 may include information which uniquely identifies enforcement module 240 or virtualization environment 150.

In particular embodiments, validation module 230 may order the virtual machine image to shutdown if virtualization environment 150 is not verified, and may allow the virtual machine image to be instantiated if virtualization environment 150 is verified. In certain embodiments, this may be accomplished through communication between verification module 231 and native application programming interface (API) 232 of guest virtual machine 210. For example, in some embodiments, verification module 231 may order native API 232 to allow the virtual machine image to be instantiated in response to successful verification of the virtualization environment 150. Verification module 231 may also deny the request to instantiate the virtual machine image in response to a failed verification of the virtualization environment 150. In such embodiments, verification module may order native API 232 to shutdown guest virtual machine 210 before any portion of the virtual machine image instantiation process begins. In further embodiments, validation module 230 may delete the virtual machine image in response to failed verification of virtualization environment 150.

Virtualization environment 150 may also run a dedicated virtual machine 240 in accordance with at least one embodiment of the present disclosure. Although guest virtual machine 210 and dedicated virtual machine are shown in FIG. 2 as running in the same virtualization environment, it will be understood by one skilled in the art that guest virtual machine 210 and dedicated virtual machine 220 may run in separate virtualization environments on shared hardware 140. In particular embodiments, dedicated virtual machine 220 may comprise an enforcement module 240, wherein the enforcement module 240 comprises logic that may be encoded in one or more tangible media and may perform operations when executed by processor 122.

In particular embodiments, enforcement module 240 on dedicated virtual machine 240 may be operable to communicate with validation module 230 on guest virtual machines 210. In certain embodiments, communication with validation module 230 on guest virtual machine 210 may be accomplished through communication module 241. In further embodiments, communication module 241 may be operable to communicate with validation module 230 through the virtualization environment API 243. In particular embodiments, communication module 241 may communicate with identification module 242, which may supply information that uniquely identifies enforcement module 240 or virtualization environment 150 in response. Communication module may then pass this information along to validation module 230 on guest virtual machine 210 in response to a request for verification of virtualization environment 150.

In particular embodiments, enforcement module 240 may also be operable to communicate with deployment policy module 250. Although deployment policy module is shown outside of virtualization environment 150, it will be understood by one skilled in the art that deployment policy module 250 may also be located in the same virtualization environment 150 as dedicated virtual machine 220. In certain embodiments, enforcement module 240 may also comprise a rules fetching module 246, a rules cache 245, a compliance module 244, and a deployment status module 247. In such embodiments, rules fetching module 246 may communicate with deployment policy module 250 and receive one or more virtual machine deployment policies from deployment policy module 250, which are then stored in rules cache 245. Compliance module 244 may then communicate with validation module 230 and determine whether guest virtual machine 210 is in compliance with the one or more virtual machine deployment policies stored in rules cache 245. In some embodiments, if guest virtual machine 210 is not compliant with one or more of the virtual machine deployment policies, compliance module 244 may generate an alert indicating non-compliance with the one or more virtual machine deployment policies. In certain embodiments, compliance module 244 may also communicate with deployment status module 247 and send compliance status information related to guest virtual machine 210. Deployment status module 247 may then communicate the compliance status information related to guest virtual machine 210 to deployment policy module 250.

FIG. 3 illustrates an example method 300 for verifying a virtualization environment before allowing the instantiation of a virtual machine image in accordance with at least one embodiment of the present disclosure. The method 300 begins at step 310, where validation module 230 receives a request to instantiate a virtual machine image in virtualization environment 150. The request to instantiate the virtual machine image may be sent by an administrator of a verified virtualization environment 150, or may be submitted by an unauthorized user of the virtual machine image. In addition, the request to instantiate the virtual machine image may be submitted either manually by the administrator or unauthorized user, or may also be submitted by virtual machine image deployment automation software.

At step 320, validation module 230 sends a request for verification of the virtualization environment. In particular embodiments, the request for verification may originate from verification module 231 inside of validation module 230. In some embodiments, the request for verification may be sent to enforcement module 240 on dedicated virtual machine 220.

At step 330, validation module 230 receives information in response to the request for verification of virtualization environment 150. In particular embodiments, the information may be received from enforcement module 240 on dedicated virtual machine 220. In further embodiments, the information may originate from identification module 242 on dedicated virtual machine 220. In some embodiments, the information may be received by validation module 230 from communication module 241 inside of enforcement module 240. In certain embodiments, the information received may include a certificate or any other suitable information that identifies enforcement module 240, dedicated virtual machine 220, or virtualization environment 150.

At step 340, validation module 230 determines whether virtualization environment 150 is verified based on the information received from enforcement module 240. Verification may be made, for example, by determining whether the information received includes a certificate issued by a trusted source. If virtualization environment 150 is verified, the method proceeds to step 341 where the virtual machine image is instantiated on guest virtual machine 210. In certain embodiments, this may be accomplished by communications between verification module 231 and native application programming interface (API) 232 of guest virtual machine 210.

If instead virtualization environment 150 is not verified, the method proceeds to step 342 where validation module 230 denies the request to instantiate the virtual machine image in virtualization environment 150. In addition to denying the request, in some embodiments, validation module 230 may communicate with native API 232 and shutdown guest virtual machine 210 in order to prevent instantiation of the virtual machine image. In particular embodiments, validation module 230 may delete the virtual machine image in response to failed verification of virtualization environment 150.

Although the present disclosure has been described in several embodiments, a myriad of changes, substitutions, and modifications may be suggested to one skilled in the art, and it is intended that the present disclosure encompass such changes, substitutions, and modifications as fall within the scope of the present appended claims.

What is claimed:

1. A method for virtual machine image deployment enforcement, comprising:
    receiving a request at a virtual machine image to instantiate a virtual machine image in a virtualization environment;
    sending a request from the virtual machine for verification of the virtualization environment from the virtual machine image;
    receiving information at the virtual machine image in response to the request for verification of the virtualization environment;
    determining whether the virtualization environment is verified based on the information received, wherein the information comprises a certificate issued by a trusted source;
    instantiating the virtual machine image on a first virtual machine in the virtualization environment in response to determining that the virtualization environment is verified; and
    communicating with a native API and preventing instantiation of the virtual machine image in response to determining that the virtualization environment is not verified.

2. The method of claim 1, further comprising:
    receiving one or more virtual machine deployment policies; and
    determining whether the first virtual machine is compliant with the one or more virtual machine deployment policies.

3. The method of claim 2, wherein it is determined that the first virtual machine is not compliant with one or more of the virtual machine deployment policies, the method further comprising generating an alert indicating non-compliance with one or more of the virtual machine deployment policies.

4. The method of claim 1, wherein the information received comprises a payload identifying a virtual machine in the virtualization environment; the method further comprising determining that the virtualization environment is not verified.

5. The method of claim 1, further comprising denying the request to instantiate the first virtual machine in the virtualization environment in response to a failed verification of the virtualization environment.

6. The method of claim 5, further comprising deleting the virtual machine image in response to a failed verification of the virtualization environment.

7. A system for virtual machine image deployment enforcement, comprising one or more processors operable to:
   receive a request at a virtual machine image to instantiate a virtual machine image in a virtualization environment;
   send a request from the virtual machine for verification of the virtualization environment;
   receive information at the virtual machine image in response to the request for verification of the virtualization environment;
   determine whether the virtualization environment is verified based on the information received, wherein the information comprises a certificate issued by a trusted source;
   instantiate the virtual machine image on a first virtual machine in the virtualization environment in response to determining that the virtualization environment is verified; and
   communicate with a native API and prevent instantiation of the virtual machine image in response to determining that the virtualization environment is not verified.

8. The system of claim 7, wherein the one or more processors are further operable to:
   receive one or more virtual machine deployment policies; and
   determine whether the first virtual machine is compliant with the one or more virtual machine deployment policies.

9. The system of claim 8, wherein it is determined that the first virtual machine is not compliant with one or more of the virtual machine deployment policies, and wherein the one or more processors are further operable to generate an alert indicating non-compliance with one or more of the virtual machine deployment policies.

10. The system of claim 7, wherein the information received comprises a payload identifying a virtual machine in the virtualization environment; the one or more processors further operable to determine that the virtualization environment is not verified.

11. The system of claim 7, wherein the one or more processors are further operable to deny the request to instantiate the virtual machine image in the virtualization environment in response to a failed verification of the virtualization environment.

12. The system of claim 11, wherein the one or more processors are further operable to delete the virtual machine image in response to a failed verification of the virtualization environment.

13. Logic encoded in non-transitory computer readable medium, the logic comprising instructions that when executed by a processor are operable to:
   receive a request at a virtual machine image to instantiate a virtual machine image in a virtualization environment;
   send a request from the virtual machine for verification of the virtualization environment;
   receive information at the virtual machine image in response to the request for verification of the virtualization environment;
   determine whether the virtualization environment is verified based on the information received, wherein the information comprises a certificate issued by a trusted source;
   instantiate the virtual machine image on a first virtual machine in the virtualization environment in response to determining that the virtualization environment is verified; and
   communicate with a native API and prevent instantiation of the virtual machine image in response to determining that the virtualization environment is not verified.

14. The logic of claim 13, wherein the instructions are further operable to: receive one or more virtual machine deployment policies; and determine whether the first virtual machine is compliant with the one or more virtual machine deployment policies.

15. The logic of claim 14, wherein it is determined that the first virtual machine is not compliant with one or more of the virtual machine deployment policies, and wherein the instructions are further operable to generate an alert indicating non-compliance with one or more of the virtual machine deployment policies.

16. The logic of claim 13, wherein the information received comprises a payload identifying a virtual machine in the virtualization environment; the instructions further operable to determine that the virtualization environment is not verified.

17. The logic of claim 13, wherein the instructions are further operable to deny the request to instantiate the virtual machine image in the virtualization environment in response to a failed verification of the virtualization environment.

18. The logic of claim 17, wherein the instructions are further operable to delete the virtual machine image in response to a failed verification of the virtualization environment.

* * * * *